United States Patent
Wu et al.

(10) Patent No.: US 9,584,806 B2
(45) Date of Patent: Feb. 28, 2017

(54) USING DEPTH INFORMATION TO ASSIST MOTION COMPENSATION-BASED VIDEO CODING

(71) Applicant: Futurewei Technologies, Inc., Plano, TX (US)

(72) Inventors: Zhenyu Wu, Plainsboro, NJ (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 761 days.

(21) Appl. No.: 13/864,672

(22) Filed: Apr. 17, 2013

(65) Prior Publication Data

US 2013/0279588 A1 Oct. 24, 2013

Related U.S. Application Data

(60) Provisional application No. 61/635,690, filed on Apr. 19, 2012.

(51) Int. Cl.
*H04N 19/00* (2014.01)
*H04N 19/51* (2014.01)
(Continued)

(52) U.S. Cl.
CPC ....... *H04N 19/00684* (2013.01); *H04N 19/23* (2014.11); *H04N 19/43* (2014.11);
(Continued)

(58) Field of Classification Search
USPC .......................................... 375/240.01–240.2
See application file for complete search history.

(56) References Cited

U.S. PATENT DOCUMENTS

| 5,943,445 A | 8/1999 | Dufaux |
| 6,055,330 A * | 4/2000 | Eleftheriadis ........... G06T 9/007 |
| | | 382/154 |

(Continued)

FOREIGN PATENT DOCUMENTS

| AU | 199923852 A1 | 11/1999 |
| CN | 101610421 A | 12/2009 |

(Continued)

OTHER PUBLICATIONS

Foreign Communication From a Counterpart Application, PCT Application No. PCT/CN2013/074436, International Search Report dated Jul. 25, 2013, 6 pages.

(Continued)

*Primary Examiner* — Dave Czekaj
*Assistant Examiner* — Shanika Brumfield
(74) *Attorney, Agent, or Firm* — Conley Rose, P.C.

(57) ABSTRACT

An apparatus comprising a plurality of ports, and a processor coupled to the ports and configured to receive a plurality of video frames from any of the ports, wherein the video frames comprise an object and a background, and wherein the video frames comprise a plurality of color pixels for the object and the background, receive a plurality of depth frames from any of the ports, wherein the depth frames comprise the object and the background, and wherein the depth frames comprise an indication of an object depth relative to a background depth, and encode the video frames using the indication of the object depth relative to the background depth.

22 Claims, 4 Drawing Sheets

(51) Int. Cl.
*H04N 19/597* (2014.01)
*H04N 19/43* (2014.01)
*H04N 19/23* (2014.01)
*H04N 19/54* (2014.01)
*H04N 19/527* (2014.01)

(52) U.S. Cl.
CPC .......... *H04N 19/54* (2014.11); *H04N 19/597* (2014.11); *H04N 19/527* (2014.11)

(56) References Cited

U.S. PATENT DOCUMENTS

| | | | |
|---|---|---|---|
| 6,111,979 A * | 8/2000 | Katto | G06T 9/001 382/154 |
| 6,157,396 A | 12/2000 | Margulis et al. | |
| 6,356,298 B1 | 3/2002 | Abe et al. | |
| 6,516,090 B1 | 2/2003 | Lennon et al. | |
| 2001/0004404 A1* | 6/2001 | Itokawa | H04N 9/8042 375/240.03 |
| 2004/0075738 A1* | 4/2004 | Burke | G08B 13/19656 348/143 |
| 2005/0031166 A1* | 2/2005 | Fujimura | G06K 9/00369 382/103 |
| 2006/0222205 A1* | 10/2006 | Porikli | G06K 9/32 348/143 |
| 2009/0201384 A1* | 8/2009 | Kang | H04N 5/2628 348/222.1 |
| 2009/0292468 A1* | 11/2009 | Wu | G01S 13/726 701/301 |
| 2010/0284466 A1* | 11/2010 | Pandit | H04N 19/597 375/240.16 |
| 2011/0090311 A1 | 4/2011 | Fang et al. | |
| 2011/0150271 A1* | 6/2011 | Lee | G06K 9/00335 382/103 |
| 2012/0026165 A1 | 2/2012 | Morifuji | |
| 2012/0323365 A1* | 12/2012 | Taylor | B25J 19/005 700/259 |

FOREIGN PATENT DOCUMENTS

| | | | |
|---|---|---|---|
| CN | 101911700 A | | 12/2010 |
| EP | 0849950 A2 | | 6/1998 |
| JP | H10285602 A | | 10/1998 |
| JP | 2000030057 A | | 1/2000 |
| JP | 2000065542 A | | 3/2000 |
| JP | 20110135458 A | | 7/2011 |
| KR | 20050066400 A | | 6/2005 |
| WO | 2010138431 A2 | | 12/2010 |

OTHER PUBLICATIONS

Foreign Communication From a Counterpart Application, PCT Application No. PCT/CN2013/074436, Written Opinion dated Jul. 25, 2013, 4 pages.

Strintzis, M., et al., "Object-Based Coding of Stereoscopic and 3D Image Sequences," IEEE Signal Processing Magazine, XP000992345, May 1999, pp. 14-28.

Zhao, T., et al., "Real-time Wide Area Multi-Camera Stereo Tracking," Proceedings of the 2005 IEEE Computer Society Conference on Computer Vision and Pattern Recognition (CVPR'05), Jun. 20, 2005, 8 pages.

Salembier, P., et al., "Region-Based Representations of Image and Video: Segmentation Tools for Multimedia Services," IEEE Transactions on Circuits and Systems for Video Technology, vol. 9, No. 8, Dec. 1999, pp. 1147-1169.

Cigla, C., et al., "Object Segmentation in Multi-View Video Via Color, Depth and Motion Cues," ICIP 2008, Oct. 12-15, 2008, pp. 2724-2727.

Foreign Communication From a Counterpart Application, European Application No. 13777894.0, Extended European Search Report dated Mar. 11, 2015, 9 pages.

Su, Y., et al., "Global Motion Estimation From Coarsely Sampled Motion Vector Field and the Applications," IEEE Transactions on Circuits and Systems for Video Technology, vol. 15, No. 2, Feb. 2005, pp. 232-243.

Chen, W., et al., "H.264/AVC Motion Estimation Implementation on Compute Unified Device Architecture (CUDA)," ICME 2008, pp. 697-700.

Yin, P., et al., "Fast Mode Decision and Motion Estimation for JVT/H.264," ICIP 2003, 4 pages.

Partial English Translation and Abstract of Japanese Patent Application No. JPA2000030057, Jan. 13, 2016, 44 pages.

Partial English Translation and Abstract of Japanese Patent Application No. JPA2000065542, Jan. 13, 2016, 21 pages.

Partial English Translation and Abstract of Japanese Patent Application No. JPH10285602, Jan. 13, 2016, 31 pages.

Foreign Communication From a Counterpart Application, Japanese Application No. 2015-506086, Japanese Office Action dated Nov. 17, 2015, 4 pages.

Foreign Communication From a Counterpart Application, Japanese Application No. 2015-506086, English Translation of Japanese Office Action dated Nov. 17, 2015, 5 pages.

Foreign Communication From a Counterpart Application, Korean Application No. 10-2014-7031185, Korean Office Action dated Aug. 31, 2015, 5 pages.

Foreign Communication From a Counterpart Application, Korean Application No. 10-2014-7031185, English Translation of Korean Office Action dated Aug. 31, 2015, 3 pages.

Harada, C., et al., "An Automatic Object Extraction Method using Disparity Map," Technical Report of The Institute of Electronics, Information and Communication Engineers, vol. 102, No. 632, Jan. 28, 2003, pp. 47-52.

Foreign Communication From a Counterpart Application, Japanese Application No. 2015-506086, Japanese Office Action dated Apr. 19, 2016, 5 pages.

Foreign Communication From a Counterpart Application, Japanese Application No. 2015-506086, English Translation of Japanese Office Action dated Apr. 19, 2016, 4 pages.

Weiss, A., et al., "Home 3D Body Scans from Noisy Image and Range Data," IEEE International Conference on Computer Vision, 2011, pp. 1951-1958.

Foreign Communication From A Counterpart Application, European Application No. 13777894.0, European Office Action dated Dec. 21, 2016, 8 pages.

* cited by examiner

USING DEPTH INFORMATION TO ASSIST MOTION COMPENSATION-BASED VIDEO CODING

CROSS-REFERENCE TO RELATED APPLICATIONS

This application claims priority to U.S. Provisional Application No. 61/635,690 filed Apr. 19, 2012 by Zhenyu Wu, et al., and titled "System and Method for Motion Compensation-Based Video Coding," which is incorporated by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Typically, video involves displaying a sequence of still images or frames in relatively quick succession, thereby causing a viewer to perceive motion. Each frame may comprise a plurality of pixels, each of which may represent a single reference point in the frame. The amount of data needed to depict even a short video segment may be substantial, resulting in difficulties when the data is communicated across a network with limited bandwidth capacity. Video may therefore be compressed via video compression hardware or software on a device that is the source of the video. The compression may be part of an encoding process prior to the video stream being communicated across the network, which decreases the quantity of data needed to communicate the video. Encoding may refer to a process of converting source data into symbols. Video may then be decompressed via video decompression hardware or software on a device that is the receiver of the video as part of a decoding process. Decoding may refer to a process of converting symbols back into source data. Improved compression and decompression techniques may increase compression ratios and thus reduce the amount of data necessary to communicate video without substantially reducing video quality. In addition, improved compression and decompression techniques may improve video quality.

SUMMARY

In one embodiment, the disclosure includes an apparatus comprising a plurality of ports, and a processor coupled to the ports and configured to receive a plurality of video frames from any of the ports, wherein the video frames comprise an object and a background, and wherein the video frames comprise a plurality of color pixels for the object and the background, receive a plurality of depth frames from any of the ports, wherein the depth frames comprise the object and the background, and wherein the depth frames comprise an indication of an object depth relative to a background depth, and encode the video frames using the indication of the object depth relative to the background depth.

In another embodiment, the disclosure includes a system comprising a camera configured to obtain a plurality of video frames, wherein the video frames comprise an object and a background, and wherein the video frames comprise a plurality of color pixels for the object and the background, a depth device configured to obtain a plurality of depth frames, wherein the depth frames comprise the object and the background, and wherein the depth frames comprise an indication of an object depth relative to a background depth, and an encoder coupled to the camera and the depth device, wherein the encoder is configured to encode the video frames using the indication of the object depth relative to the background depth.

In yet another embodiment, the disclosure includes a method comprising receiving a plurality of video frames from any of the ports, wherein the video frames comprise an object and a background, and wherein the video frames comprise a plurality of color pixels for the object and the background, receiving a plurality of depth frames from any of the ports, wherein the depth frames comprise the object and the background, and wherein the depth frames comprise an indication of an object depth relative to a background depth, and encoding the video frames using the indication of the object depth relative to the background depth.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
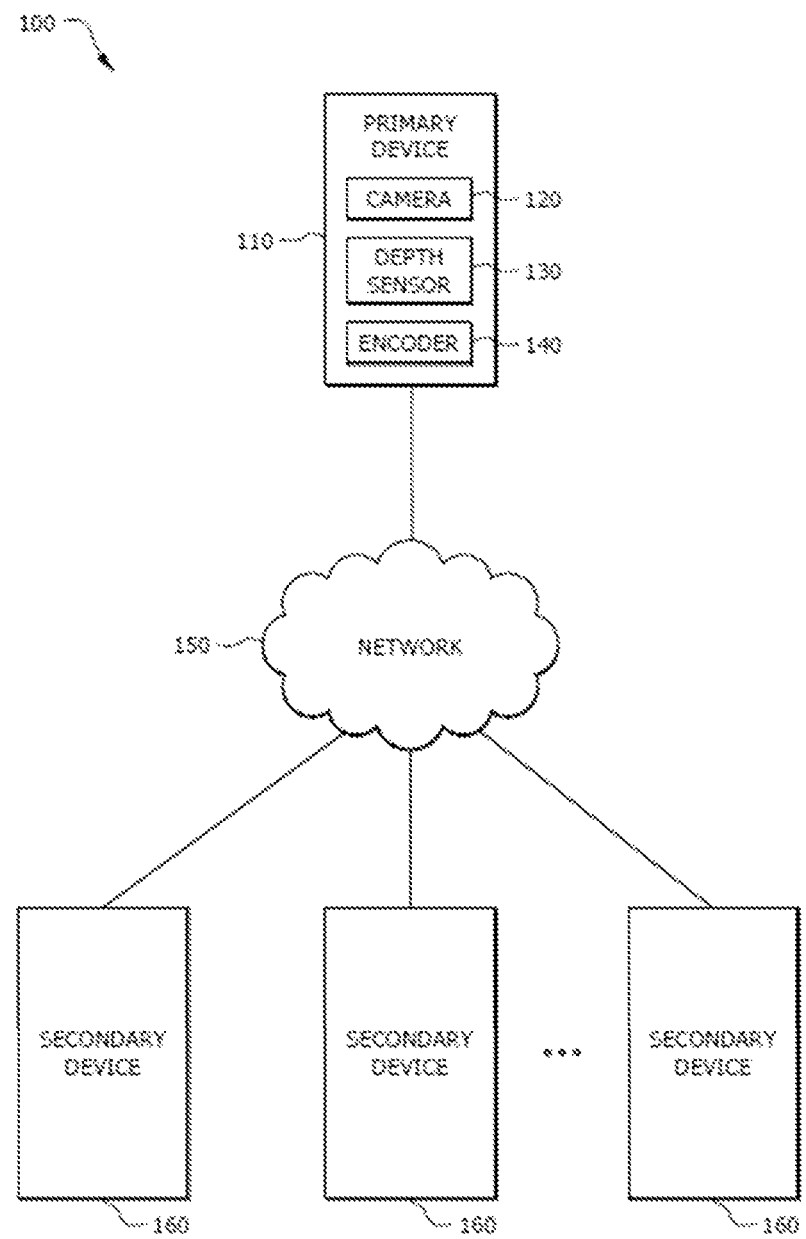
FIG. 1 is a schematic diagram of a communication system according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video encoding may comprise motion estimation. In the context of video encoding, motion estimation may refer to a particular process for determining motion vectors relating one video frame to another video frame. Motion estimation may employ a block matching algorithm. In such an algorithm, an encoder may divide a video frame into macroblocks, which, in turn, may be sub-divided into smaller sub-macroblocks. The original macroblocks and sub-divided sub-macroblocks may also be referred to as coding blocks. The encoder may identify a first macroblock in a first video frame. Then, by sequentially scanning each macroblock across a second video frame, the encoder may identify a second macroblock in the second video frame that most closely resembles the first macroblock in the first video frame. If the second macroblock is shifted along a two-dimensional grid with respect to the first macroblock, then the encoder may, upon encoding the data from the two video frames, fully describe the first macroblock and describe the second macroblock only in terms of a motion vector describing the shifted distance. Otherwise, the encoder may fully describe both the first macroblock and the second macroblock. When compared to the latter scenario, the former scenario employing a motion vector may reduce the amount of data needed to describe the two video macroblocks and thus the two video frames. The encoder may repeat the process and determine motion estimation information for a finite number of video frames at a time until, for example, a video conference is complete.

Motion estimation may be a substantial source of computational resource consumption for video encoding. In some cases, motion estimation may account for 60% to 70% of the computational resource consumption. Some existing solutions therefore attempt to reduce the computational resource consumption of motion estimation using improved algorithms, such as fast motion estimation and mode decision techniques. In the example of the two video frames and two macroblocks above, the encoder may search for the second macroblock using pre-defined search patterns and early termination criteria. In using those techniques, the encoder may skip searching candidates in the second video frame that are unlikely to match the first macroblock. Continuing with the example of the two video frames and the two macroblocks above, the encoder may first look for spatial and/or temporal neighbors of the first macroblock, or the encoder may look for the first macroblock's co-located block at a different spatial resolution. Other existing solutions may require powerful hardware, such as more powerful graphics processing units (GPUs), digital signal processors (DSPs), and field-programmable gate arrays (FPGAs). However, such systems and architectures are undesirable from a computational resource consumption standpoint.

Disclosed herein are systems and methods for an improved encoding technique. The disclosed technique may apply to videoconferencing, telepresence, video surveillance, and other applications involving images or videos. With this technique, video may be captured by both a pixel-based camera and a depth device. An encoder may then segment objects using both pixel data and depth data, track those objects across video frames, construct motion models of those objects, and derive motion vectors of those objects based on the motion models. In this context, segmentation may refer to partitioning a frame into sets of pixels. For example, an individual object in the frame may be partitioned from the rest of the frame. By employing this technique, the encoder may at least partially reduce the amount of motion estimation that would otherwise be needed. The reduction in motion estimation may lead to reduced computational resource consumption, which may result in a need for less complex hardware and thus reduce hardware cost and power consumption. The reduced computational resource consumption may also result in a need for less data and thus improve video capacity and video quality. Furthermore, the disclosed technique may directly result in improved compression efficiency. Finally, the disclosed technique may directly result in improved video quality.

The reduction in computational resource consumption using the disclosed technique may occur in at least two ways. First, the encoder may, for the modeled objects, bypass motion estimation in favor of the disclosed technique. Deriving the motion vectors for the modeled objects using the disclosed technique may require less computational resource consumption than motion estimation otherwise would. Second, instead of bypassing motion estimation for the modeled objects, the encoder may use the derived motion vectors to determine better (e.g., more optimal) motion predictors to start motion estimation for macroblocks within the modeled objects than previous techniques. In that way, the encoder may decrease computational resource consumption by avoiding searching for macroblocks that are unlikely matches.

The improved compression efficiency using the disclosed technique may occur in at least two ways. First, as discussed above, motion estimation may comprise an encoder sequentially scanning each macroblock across a video frame until it finds a matching macroblock. When doing so, the encoder does not yet know the motion vectors for unencoded macroblocks neighboring the matching macroblock. That process may result in a motion vector that is better (e.g., more optimal) for the matching macroblock, but suboptimal when the neighboring macroblocks are considered together. With the disclosed technique, the encoder may know the motion vectors for neighboring macroblocks belonging to modeled objects. The encoder may use that information to derive better (e.g., more optimal) motion vectors for the un-modeled areas of the video frame. Second, as discussed above, the encoder may use the derived motion vectors to determine better (e.g., more optimal) motion predictors. Given a fixed-size motion search window, the better motion predictors may produce better (e.g., more optimal) motion estimation motion vectors than previous techniques.

The disclosed technique may directly improve quality because the depth data may more accurately reflect the true motion of the object. For that reason, the disclosed technique may result in fewer artifacts, or distortions, when compared to using pixel data only.

FIG. 1 is a schematic diagram of a communication system 100 according to an embodiment of the disclosure. The communication system 100 may comprise a primary device 110 communicatively coupled to a plurality of secondary devices 160 via a network 150. The primary device 110 may be a mobile phone, a tablet computer, a desktop computer, a notebook computer, or another device. Each of the secondary devices 160 may likewise be a mobile phone, a tablet computer, a desktop computer, a notebook computer, or another device. The network 150 may be the Internet, a wireless mobile phone network, or another network.

The primary device 110 may comprise a camera 120, a depth device 130, and an encoder 140. The camera 120 may be any camera suitable for capturing images or video frames. Images or video frames are well known in the art, and each image or video frame may comprise a plurality of pixels in a red-green-blue (RGB) or other suitable color space. The depth device 130 may be part of the primary device 110 as shown. Alternatively, the depth device 130 may be an attachment to the primary device 110 or may simply be communicatively coupled to the primary device 110. The depth device 130 may be a depth sensor, a light field camera, a ranging camera, an infrared camera, an ultraviolet camera, a radar or sonar assembly, a complementary metal-oxide-semiconductor (CMOS) visual sensor, a charged-coupled device (CCD) visual sensor, a combination of visual sensors, or another depth device suitable for capturing depth frames. The depth device 130 may capture such depth frames in coordination with the camera 120, and as such is generally located close to (e.g., within six inches of) the camera 120 and has a viewing angle similar to that of the camera 120. In other words, if the camera 120 captures a video frame of a specific area of focus at a specific time, the depth device 130 may capture a depth frame corresponding to the same area of focus and the same time. The depth device 130 may capture the depth frames using infrared or other electromagnetic waves. The depth frames may comprise a plurality of different intensity values representing different depths. For example, high or bright intensities may represent objects that are relatively closer to the depth device 130, while low or dim intensities may represent objects that are relatively farther from the depth device 130. Alternatively, the depth frames may comprise an approximate or absolute (e.g., numerical) measurement of the distance of some or all of the pixels in the objects from the depth device 130. In an embodiment, a depth frame may comprise pixels so that each pixel of the depth frame corresponds to a pixel located at the same area of the corresponding video frame.

Figure 2:
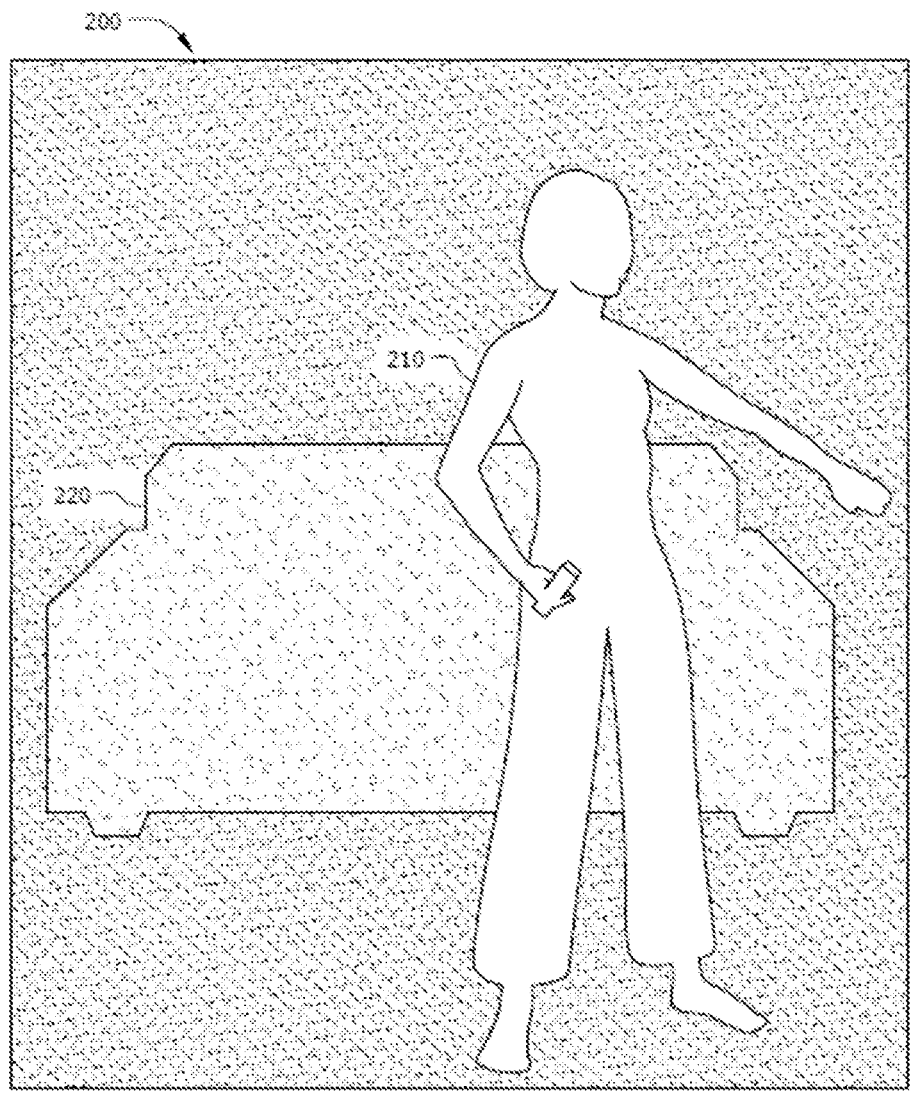
FIG. 2 is an example of a depth frame.

FIG. 2 is an example of a depth frame 200. The depth frame 200 comprises a person 210 in a foreground of the depth frame 200 and a sofa 220 in a background of the depth frame 200. As shown, the person 210 is relatively close in the depth frame 200 and is therefore represented by bright intensities or less dense shading, while the sofa 220 is relatively far away in the depth frame 200 and is therefore represented by dim intensities or denser shading. The area behind the sofa 220 is even farther away and is therefore represented by even dimmer intensities or even denser shading. One skilled in the art will appreciate how a depth frame may typically appear.

Returning to FIG. 1, the encoder 140 may be any encoder suitable for encoding video data. The encoder 140 may be an individual module or it may be part of a larger computing process. It will be appreciated that the primary device 110 may also comprise a video decoder (not shown) and perhaps a display screen (not shown).

The depth device 130 may have some limitations. First, differences in the distance between the depth device 130 and the object, the minimum distinguishable distance difference, and viewing angles may decrease performance. Second, it may be important to carefully coordinate the camera 120 and the depth device 130 in order to properly align the video frames and the depth frames. Without such careful coordination, the disclosed technique may not be fully appreciated.

The primary device 110 may participate in a video call with at least one of the secondary devices 160. The primary device 110 and each of the participating secondary devices 160 may transmit and receive data to participate in the video call. For example, the primary device 110 may capture data via the camera 120 and the depth device 130, encode the data via the encoder 140, and transmit that encoded data to the participating secondary devices 160. At the same time, the primary device 110 may receive encoded data from the participating secondary devices 160 and decode that received data. As such, the secondary devices 160 may comprise the same components as the primary device 110. The primary device 110 and each of the secondary devices 160 may perform the above tasks and the tasks described below through any combination of hardware and software.

Figure 3:
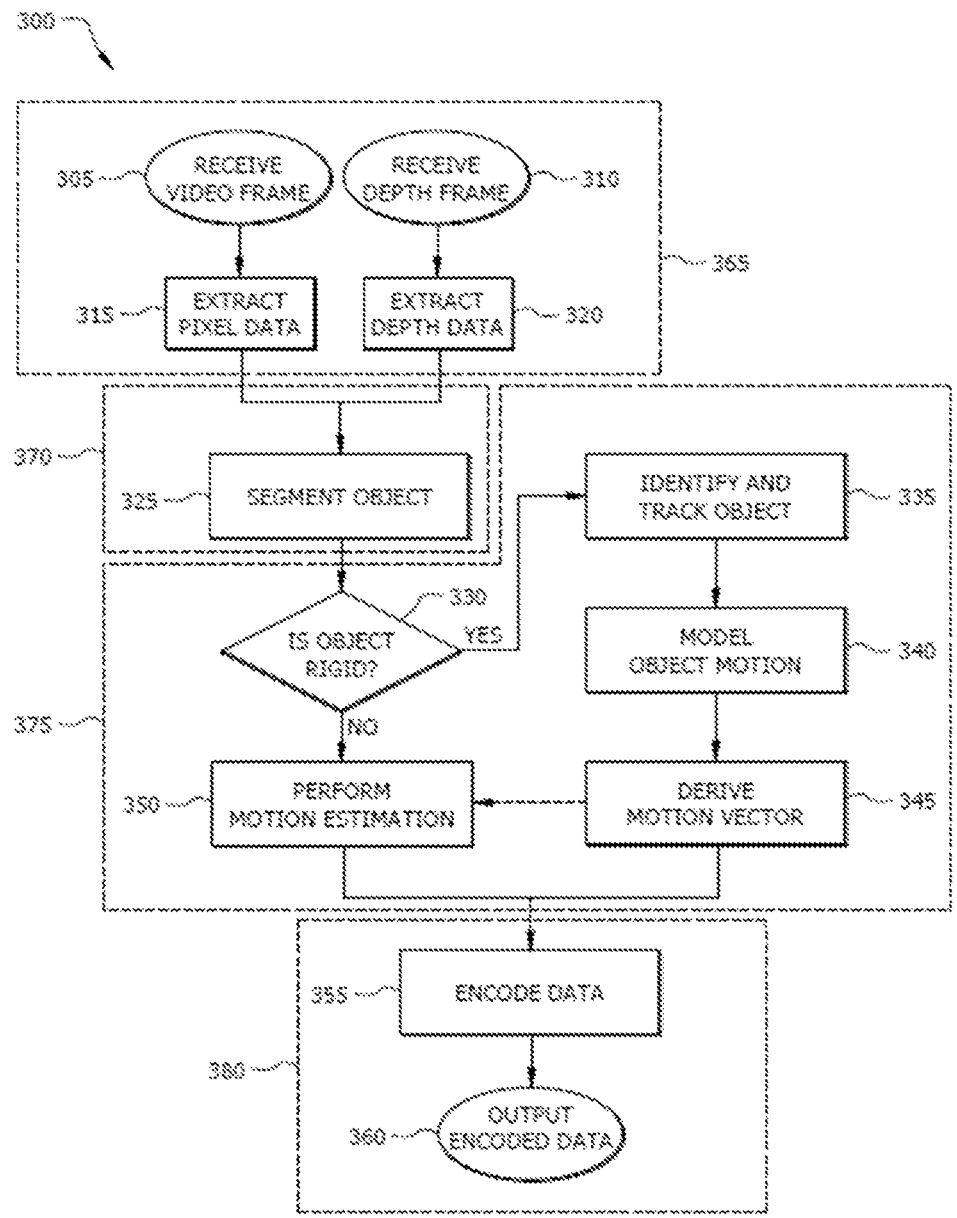
FIG. 3 is a flowchart illustrating a video encoding method according to an embodiment of the disclosure.

FIG. 3 is a flowchart illustrating a video encoding method 300 according to an embodiment of the disclosure. The method 300 may be implemented in the primary device 110 described above, for example, in the encoder 140. In addition, the method 300 may include the generic steps of image extraction 365, object segmentation 370, motion calculation 375, and video encoding 380.

The method 300 may begin at step 305, where a video frame may be received from any suitable source, such as the camera 120. At step 310, a depth frame may be received from any suitable source, such as the depth device 130. As described above, the video frame and the depth frame may correspond to the same area of focus at the same time. At step 315, pixel data may be extracted from the video frame. The pixel data may be the red, green, and blue values used to form each pixel in the video frame. At step 320, depth data may be extracted from the depth frame. The depth data may be the intensity values used to form each pixel in the depth frame and may indicate the relative distances of objects from the depth device 130.

At step 325, an object may be segmented. The object may, for example, be a sofa in a background of the video frame and the depth frame (as shown in FIG. 2). Color patterns in the video frame may be used to segment the object. For example, if the sofa has red and white stripes, then the encoder 140 would segment the sofa from the rest of the video frame by distinguishing and segmenting the group of red and white colors from the rest of the video frame. However, object segmentation using only pixel data may be relatively complex and error-prone. For example, if a person in the foreground of the video frame is wearing a shirt with red and white stripes, then the encoder 140 may incorrectly segment both the person's shirt and the sofa as one object because the two objects share similar patterns and colors. Object segmentation using depth data may determine depth patterns in depth frames. For example, the sofa may be at a substantially uniform depth in the background of the depth frame, and hence its pixels will exhibit a substantially similar intensity among themselves. Because the sofa is in the background, the sofa may exhibit relatively dim intensities. Contrarily, because the person's shirt is in the foreground, the person's shirt may exhibit relatively bright intensities. Object segmentation using depth data may be highly correlated with object segmentation using pixel data, meaning the two object segmentation methods may complement each other and provide for improved object segmentation. The improvement may be particularly apparent when segmenting objects in frames with distinct foreground objects and distinct background objects. For example, while object segmentation using only pixel data may combine the person's shirt and the sofa as one segmented object, also employing object segmentation using depth data may help distinguish the person's shirt from the sofa. Thus, employing object segmentation using both pixel data and depth data may lower complexity and improve reliability compared to object segmentation using only pixel data.

At step 330, the method 300 may determine if the segmented object is rigid. A rigid object may refer to an object that may move locations across video frames, but does not substantially change within the boundaries of the object itself. For example, the sofa may move across video frames if the camera 120 moves its area of focus; however, the sofa itself may not substantially change its shape or color. Contrarily, a person's face may change its shape across video frames. For example, a person may open his mouth to speak or close his eyes to blink. If the object is not rigid, then the process may proceed to step 350. At step 350, the encoder may perform motion estimation of the object and proceed to step 355. If the object is rigid, then the method 300 may proceed to step 335. It is important to note that object segmentation may comprise segmenting parts of a larger object, for example, a human torso from the rest of the human body. This may be done because the torso may remain rigid across video frames, while the face may change its shape across video frames. In addition, a primary object may be segmented by distinguishing its depth from secondary objects. The secondary objects may be considered as being in the background because they may be behind the primary object. In other words, the words "foreground" and "background" may be used in relative terms.

At step 335, the object may be identified and tracked. In other words, the encoder 140 may employ the dual object segmentation methods described above and identify in a finite number of subsequent frames the object that was segmented in the first frame. The method 300 may then track how that object moves across frames.

At step 340, the object motion may be modeled. The encoder 140 may do so using any suitable global motion models, including translational, geometric, affine, and perspective models. Those models are listed in order of lower-order models to higher-order models corresponding to more specific to more general motions and are described in "Global Motion Estimation from Coarsely Sampled Motion Vector Field and the Applications," Yeping Su, et al., IEEE Transactions on Circuits and Systems for Video Technology, vol. 15, no. 2, February 2005, which is incorporated by reference as if reproduced in its entirety.

At step 345, the method 300 may use the object motion modeling described above to derive a motion vector for each coding block of the object. The motion vectors may describe the actual motion trajectory of each coding block of the object across frames. In addition, the method 300 may determine from the depth frames that objects not moving across frames are static background with no motion.

The method 300 may then proceed to either step 350 or step 355. If proceeding to step 350, the method 300 may, as described above, use the derived motion vectors to determine more optimal motion predictors to start motion estimation for coding blocks within the modeled objects, then proceed to step 355. Otherwise, the process may proceed directly to step 355. At step 355, the method 300 may encode the data, including the derived motion vectors, describing the video frames. At step 360, the method 300 may output the encoded data, for example, transmit the encoded video data to the secondary devices 160. By using the above method 300 of deriving and encoding motion vectors for rigid objects, the encoder may be said to be using motion compensation-based video coding.

The improved compression efficiency described herein may depend on how accurately objects may be segmented and tracked. For example, applications like video conferencing and video surveillance, where objects are relatively distinct and exhibit simple motions, may demonstrate the most improvement.

Figure 4:
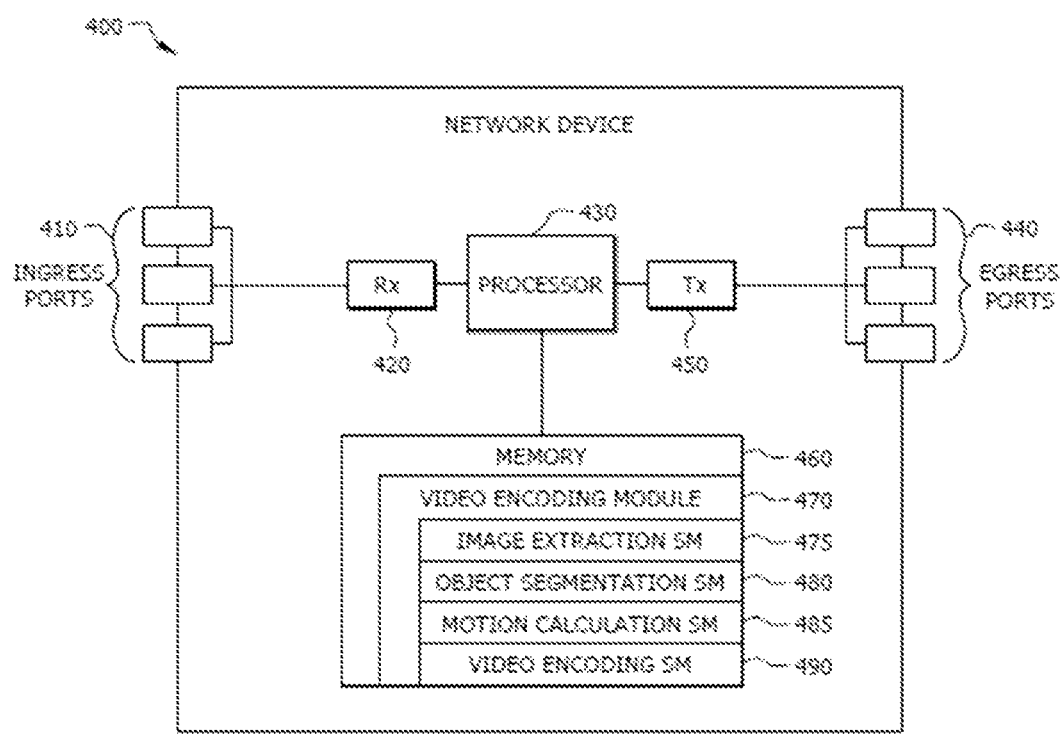
FIG. 4 is a schematic diagram of a network device according to an embodiment of the disclosure.

FIG. 4 is a schematic diagram of a network device 400 according to an embodiment of the disclosure. The network device 400 may comprise a plurality of ingress ports 410 and/or receiver units (Rx) 420 for receiving data, a processor or logic unit 430 to process signals, a plurality of egress ports 440 and/or transmitter units (Tx) 450 for transmitting data to other components, and a memory 460. The network device 400 may be suitable for implementing the features, methods, and devices described above, and as such may be part of the primary device 110 and/or the secondary devices 160 illustrated in FIG. 1 and described in the disclosure. For example, the ingress ports 410 may be coupled to the camera 120 and the depth device 130, and the egress ports 440 may be coupled to the network 150. In addition, the encoder 140 may be implemented in the processor 430 and/or the memory 460. As such, the processor 430 and/or the memory 460 may comprise a video encoding module 470, which may correspond to the method 300. The video encoding module 470 may comprise an image extraction sub-module 475 (which may comprise instructions for implementing the image extraction 365), an object segmentation sub-module 480 (which may comprise instructions for implementing the object segmentation 370), a motion calculation sub-module 485 (which may comprise instructions for implementing the motion calculation 375), and a video encoding sub-module 490 (which may comprise instructions for implementing the video encoding 380).

The processor 430, which may be referred to as a central processing unit (CPU), may be in communication with the ingress ports 410, receiver units 420, egress ports 440, transmitter units 450, and memory 460. The processor 430 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs.

The memory 460 may be comprised of one or more disks, tape drives, or solid-state drives; may be used for non-volatile storage of data and as an over-flow data storage device; may be used to store programs when such programs are selected for execution; and may be used to store instructions and perhaps data that are read during program execution. The memory 460 may be volatile and/or non-volatile and may be read only memory (ROM) and/or random access memory (RAM).

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
    a plurality of ports; and
    a processor coupled to the ports and configured to:
    receive a plurality of video frames from any of the ports, wherein the video frames comprise an object and a background, and wherein the video frames comprise a plurality of color pixels for the object and the background;
    receive a plurality of depth frames from any of the ports, wherein the depth frames comprise the object and the background, and wherein the depth frames comprise an indication of an object depth relative to a background depth;
    determine to perform object motion modeling when the object is rigid, wherein the object is rigid when the object does not substantially change within its own boundaries across the video frames;
    determine to perform motion estimation when the object is not rigid; and
    encode the video frames using the indication of the object depth relative to the background depth.

2. The apparatus of claim 1, wherein the processor is further configured to encode the video frames by:
    extracting the color pixels from the video frames;
    extracting the indication of the object depth relative to the background depth from the depth frames;
    segmenting the object from the background using the indication of the object depth relative to the background depth;
    calculating a motion of the object based on the segmenting; and
    encoding the object.

3. The apparatus of claim 2, wherein calculating the motion of the object comprises:
    determining that the object is not rigid; and
    performing the motion estimation for the object in response to the determining that the object is not rigid.

4. The apparatus of claim 2, wherein calculating the motion of the object comprises:
    determining that the object is rigid;
    tracking the object across the background over the video frames and the depth frames;
    performing motion modeling of the object in response to the determining that the object is rigid; and
    deriving a motion vector for a first coding block of the object.

5. The apparatus of claim 4, wherein the processor is further configured to:
    use the motion vector to describe a first motion of the first coding block; and
    use the motion estimation to describe a second motion of a second coding block of the video frames.

6. The apparatus of claim 5, wherein the motion modeling is based on a translational, geometric, affine, or perspective model.

7. The apparatus of claim 1, wherein the processor is further configured to represent the indication of the object depth relative to the background depth by differences in color intensity.

8. The apparatus of claim 1, wherein the processor is further configured to represent the indication of the object depth relative to the background depth by numerical distances of the object from a depth sensor.

9. The apparatus of claim 1, wherein the apparatus is configured to use the video frames for videoconferencing, telepresence, or video surveillance.

10. A system comprising:
    a camera configured to obtain a plurality of video frames, wherein the video frames comprise an object and a background, and wherein the video frames comprise a plurality of color pixels for the object and the background;
    a depth device configured to obtain a plurality of depth frames, wherein the depth frames comprise the object and the background, and wherein the depth frames comprise an indication of an object depth relative to a background depth; and
    an encoder coupled to the camera and the depth device, wherein the encoder is configured to:
    determine to perform object motion modeling when the object is rigid, wherein the object is rigid when the object does not substantially change within its own boundaries across the video frames;
    determine to perform motion estimation when the object is not rigid; and
    encode the video frames using the indication of the object depth relative to the background depth.

11. The system of claim 10, wherein the encoder comprises:
    an image extraction sub-module configured to extract the color pixels from the video frames and extract the indication of the object depth relative to the background depth from the depth frames;
    an object segmentation sub-module configured to segment the object from the background using the indication of the object depth relative to the background depth;
    a motion calculation sub-module configured to calculate a motion of the object; and
    a video encoding sub-module configured to encode the object.

12. The system of claim 11, wherein calculating the motion of the object comprises:
    determining that the object is rigid;
    tracking the object across the background over the video frames and the depth frames in response to the determining that the object is rigid;

modeling the motion of the object in response to the tracking; and deriving a motion vector for a coding block of the object in response to the modeling.

13. The system of claim 12, wherein the depth device is an infrared camera.

14. The system of claim 12, wherein the depth device is an ultraviolet camera.

15. The system of claim 12, wherein the depth device is a radar system or a sonar system.

16. The system of claim 12, wherein the depth device is a depth sensor, a light field camera, a ranging camera, a complementary metal-oxide-semiconductor (CMOS) visual sensor, a charged-coupled device (CCD) visual sensor, or a combination of visual sensors.

17. A method comprising:
receiving a plurality of video frames, wherein the video frames comprise an object and a background, and wherein the video frames comprise a plurality of color pixels for the object and the background;
receiving a plurality of depth frames, wherein the depth frames comprise the object and the background, and wherein the depth frames comprise an indication of an object depth relative to a background depth;
determining to perform object motion modeling when the object is rigid, wherein the object is rigid when the object does not substantially change within its own boundaries across the video frames;
determining to perform motion estimation when the object is not rigid; and
encoding the video frames using the indication of the object depth relative to the background depth.

18. The method of claim 17, wherein encoding the video frames comprises:
extracting the color pixels from the video frames;
extracting the indication of the object depth relative to the background depth from the depth frames;
segmenting the object from the background using the indication of the object depth relative to the background depth;
calculating a motion of the object; and
encoding the object.

19. The method of claim 18, wherein calculating the motion of the object comprises:
determining that the object is not rigid; and
performing the motion estimation for the object in response to the determining that the object is not rigid.

20. The method of claim 18, wherein estimating the motion of the object comprises:
determining that the object is rigid;
tracking the object across the background over the video frames and the depth frames;
performing motion modeling of the object in response to the determining that the object is rigid; and
deriving a motion vector for a coding block of the object.

21. The system of claim 10, wherein rigidity is independent of motion.

22. An apparatus comprising:
a receiver configured to receive a plurality of video frames and a plurality of depth frames associated with the video frames;
a processor coupled to the receiver and configured to:
extract pixel data from the video frames, wherein the pixel data is associated with colors in the video frames;
extract depth data from the depth frames, wherein the depth data is associated with intensities in the depth frames;
segment an object based on a complementary combination of both the colors and the intensities to produce segmented data; and
generate encoded data based on the segmented data; and
a transmitter coupled to the processor and configured to transmit the encoded data.

* * * * *